(12) United States Patent
Hashimoto et al.

(10) Patent No.: US 7,180,636 B2
(45) Date of Patent: Feb. 20, 2007

(54) IMAGE PROCESSOR AND METHOD (75) Inventors: Keisuke Hashimoto, deceased, late of Ibaraki (JP); by Fujio Hashimoto, legal representative, Ibaraki (JP); by Nobue Hashimoto, legal representative, Ibaraki (JP); Yoshihiko Hirota, Toyokawa (JP)

(73) Assignee: Minolta Co. Ltd., Osaka (JP)

( * ) Notice: Subject to any disclaimer, the term of this patent is extended or adjusted under 35 U.S.C. 154(b) by 619 days.

(21) Appl. No.: 09/935,345

(22) Filed: Aug. 23, 2001

(65) Prior Publication Data
US 2002/0057464 A1 May 16, 2002

(30) Foreign Application Priority Data
Aug. 24, 2000 (JP) ............................... 2000-253805

(51) Int. Cl.
*H04N 1/405* (2006.01)

(52) U.S. Cl. ...................................... 358/3.15; 358/2.1

(58) Field of Classification Search ................. 358/1.9, 358/2.1, 3.14–3.15, 3.27; 382/199–200, 382/266–269
See application file for complete search history.

(56) References Cited

U.S. PATENT DOCUMENTS

| 5,483,355 A | * | 1/1996 | Overton ....................... 358/463 |
| 5,850,293 A |   | 12/1998 | Suzuki et al. |
| 5,852,475 A | * | 12/1998 | Gupta et al. ................. 348/606 |
| 6,775,031 B1 | * | 8/2004 | Fujiwara ..................... 358/2.1 |

FOREIGN PATENT DOCUMENTS

JP  2000-022958  1/2000

* cited by examiner

*Primary Examiner*—Thomas D. Lee
*Assistant Examiner*—Stephen Brinich
(74) *Attorney, Agent, or Firm*—Morrison & Foerster LLP (57) ABSTRACT

The present invention relates to an image processor provided in apparatuses such as digital copiers and printers, and that distinguishes between a character edge region and a continuous tone region of an original image and switches the tone reproduction processing between the regions.

2 Claims, 14 Drawing Sheets

FIG. 1

| V11 | V12 | V13 | V14 | V15 |
|---|---|---|---|---|
| V21 | V22 | V23 | V24 | V25 |
| V31 | V32 | V33 | V34 | V35 |
| V41 | V42 | V43 | V44 | V45 |
| V51 | V52 | V53 | V54 | V55 |

| 1 | 2 | 2 | 2 | 1 |
|---|---|---|---|---|
| 2 | 4 | 4 | 4 | 2 |
| 2 | 4 | 4 | 4 | 2 |
| 2 | 4 | 4 | 4 | 2 |
| 1 | 2 | 2 | 2 | 1 |

PARAMETER RAM A

| 16 | 16 | 16 | 16 | 0 |
|----|----|----|----|----|
| 16 | 16 | 16 | 16 | 16 |
| 16 | 16 | 16 | 16 | 16 |
| 16 | 16 | 16 | 16 | 16 |
| 16 | 16 | 16 | 16 | 16 |

FIG. 8

PARAMETER RAM B

| 0   | 64  | 128 | 192 | 0   |
|-----|-----|-----|-----|-----|
| 208 | 16  | 80  | 144 | 208 |
| 160 | 224 | 32  | 96  | 160 |
| 112 | 176 | 240 | 48  | 112 |
| 0   | 64  | 128 | 192 | 0   |

IMAGE PROCESSOR AND METHOD

CROSS-REFERENCE TO RELATED APPLICATIONS

This application is based on application No. 2000-253805 filed in Japan, the contents of which are hereby incorporated by reference.

TECHNICAL FIELD OF THE INVENTION

The present invention relates to an image processor provided in apparatuses such as digital copiers and printers, and in particular, to an image processor that distinguishes between a character edge region and a continuous tone region of an original image and switches the tone reproduction processing between the regions.

BACKGROUND OF THE INVENTION

Original images include both characters and halftone images. Therefore, it is necessary to prevent moiré generation while ensuring character sharpness. For this purpose, in a conventional image processor, region discrimination is performed to separate the original image into a character edge region and a continuous tone region, and by switching the tone reproduction method between the regions, moiré generation is reduced while character sharpness is ensured. To reduce moiré generation, smoothing on the continuous tone region is widely performed.

Figure 15:
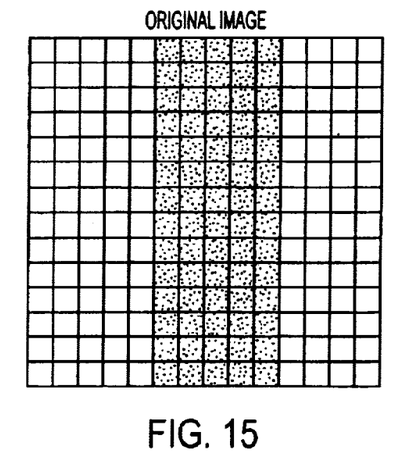
FIG. 15 shows an original image.
Figure 20:
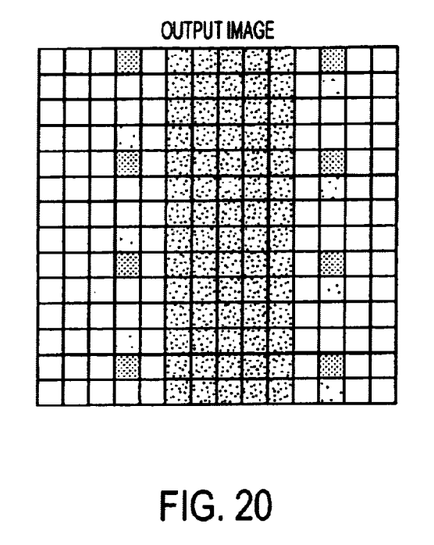
FIG. 20 shows the output image of a conventional image processor.

However, with the conventional image processor, as shown in FIG. 20, noises are sometimes caused around the character edge region due to smoothing in a reproduced image of an original image (see FIG. 15). This is because the size of the filter for region discrimination is smaller than that of the filter for smoothing. That is, smoothing is performed on white pixels in the continuous tone region existing outside the character edge region. However, when the region determined to be the character edge region by region discrimination is smaller than the size of the filter for smoothing, the filter for smoothing may include some of the characters. When black pixels of characters are included in the filter for smoothing, pixels that should be white pixels have a certain degree of density and produce noises. These noises become more noticeable when dithering or screening is performed. As described above, the conventional image processor causes degradation in reproduced image quality.

SUMMARY OF THE INVENTION

The present invention provides an image processor in which degradation in reproduced image quality is prevented by keeping noises from being caused around the character edge region due to smoothing.

In one embodiment of the invention, an image processor comprises a region discrimination unit that determines whether a target pixel is a pixel in a character edge region or a pixel in a continuous tone region based on image data in a reference pixel matrix including the target pixel, a first processing unit that performs on the image data processing including smoothing by a smoothing filter, and an image output unit that outputs image data processed by the first processing unit when the region discrimination unit determines that the target pixel is a pixel in the continuous tone region. When a reference pixel matrix size in the region discrimination unit is n×n pixels and a smoothing filter size in the first processing unit is m×m pixels, a relationship $n \geq m$ holds, wherein the smoothing process is performed to reduce moiré generation caused by screen cycle of the screening process.

In one aspect of the invention, when the region discrimination unit determines that the target pixel is a pixel in the character edge region, the image output unit outputs image data not undergoing the processing by the first processing unit.

In another aspect of the invention, a second processing unit that performs edge enhancement on the image data is further provided, and when the region discrimination unit determines that the target pixel is a pixel in the character edge region, the image output unit outputs image data having undergone the processing by the second processing unit.

The second processing unit further performs screening on the image data having undergone smoothing.

In another embodiment of the invention, an image processor comprises a region discrimination unit that determines whether each pixel of image data is a pixel in a character edge region or a pixel in a continuous tone region, a first tone reproduction unit that performs on the image data a tone reproduction processing emphasizing resolution, a second tone reproduction unit that performs on the image data a tone reproduction processing emphasizing gradation, and an image output unit that produces an output after performing the processing by the first tone reproduction unit or the processing by the second tone reproduction unit based on a result of the determination by the region discrimination unit. The processing by the second tone reproduction unit includes at least smoothing or the image data and screening on the image data having undergone smoothing, the smoothing is performed to reduce moiré generated by screening. When a region discrimination size in the region discrimination unit is n×n pixels and a size of a filter for the smoothing performed by the second tone reproduction unit is m×m pixels, a relationship $n \geq m$ holds.

In one aspect of the invention, the image output unit outputs image data processed by the first tone reproduction unit for a pixel determined to be a pixel in the character edge region by the region discrimination unit, and outputs image data processed by the second tone reproduction unit for a pixel determined to be a pixel in the continuous tone region by the region discrimination unit.

The second tone reproduction unit further performs screening on the image data having undergone smoothing.

In still another embodiment of the invention, an image processing method comprises obtaining image data, determining whether a target pixel is a pixel in a character edge region or a pixel in a continuous tone region based on image data in a reference pixel matrix including the target pixel, and performing smoothing by a smoothing filter when the target pixel is determined to be a pixel in the continuous tone region by the region discrimination unit, performing screening on the image data having undergone smoothing and outputting processed image data. When a size of the reference pixel matrix is n×n pixels and a size of the smoothing filter is m×m pixels, a relationship $n \geq m$ holds.

These and other advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
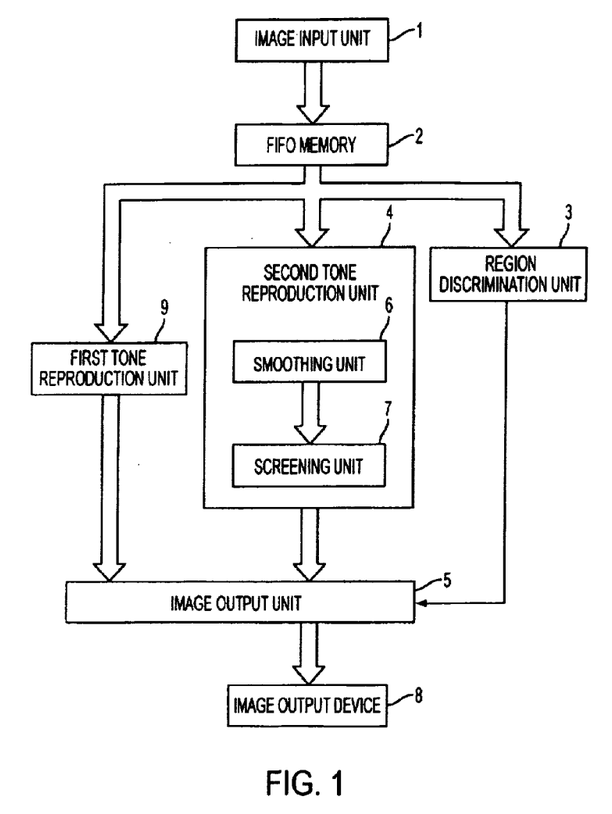
FIG. 1 shows an exemplary structure of an image processor.

An embodiment of the image processor according to the present invention will be described in detail with reference to the drawings. First, the structure of the image processor will be described. The image processor according to this embodiment includes, as shown in FIG. 1, an image input unit 1, a FIFO memory 2, a region discrimination unit 3, a first tone reproduction unit 9, a second tone reproduction unit 4, and an image output unit 5.

Figure 2:
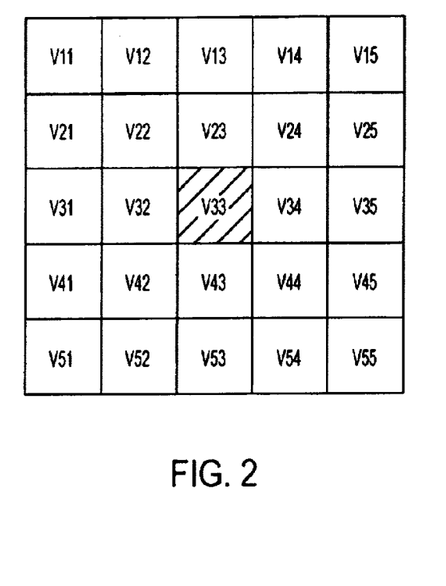
FIG. 2 shows an exemplary structure of image data processed by a first in/first out (FIFO) memory.
Figure 3:
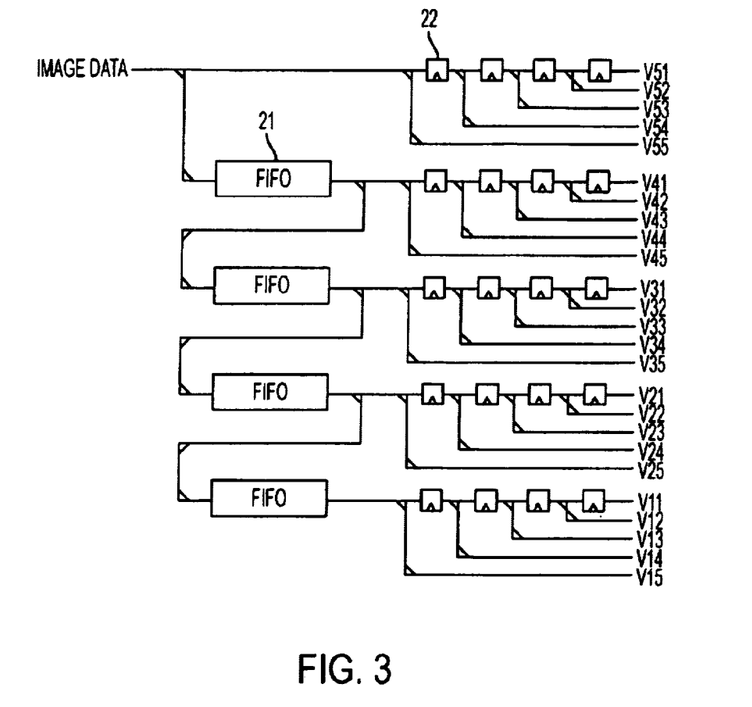
FIG. 3 shows an exemplary structure of a FIFO memory.

The image input unit 1 is supplied with image data (tone level data) of an original image, such as an image scanner corresponding thereto. As the image input unit 1, for example an input port supplied with print data sent from an external data processor, and a fax modem that obtains image data by receiving data sent from an external fax are in addition to the image scanner. The FIFO memory 2 obtains a pixel matrix, as shown in FIG. 2, from the image data supplied to the image input unit 1. The FIFO memory 2 comprises, as shown in FIG. 3, four FIFOs 21 and twenty flip-flops (FFs) 22. The pixel matrix is supplied to each of the region discrimination unit 3, the second tone reproduction unit 4 and the first tone reproduction unit 9.

Figure 4:
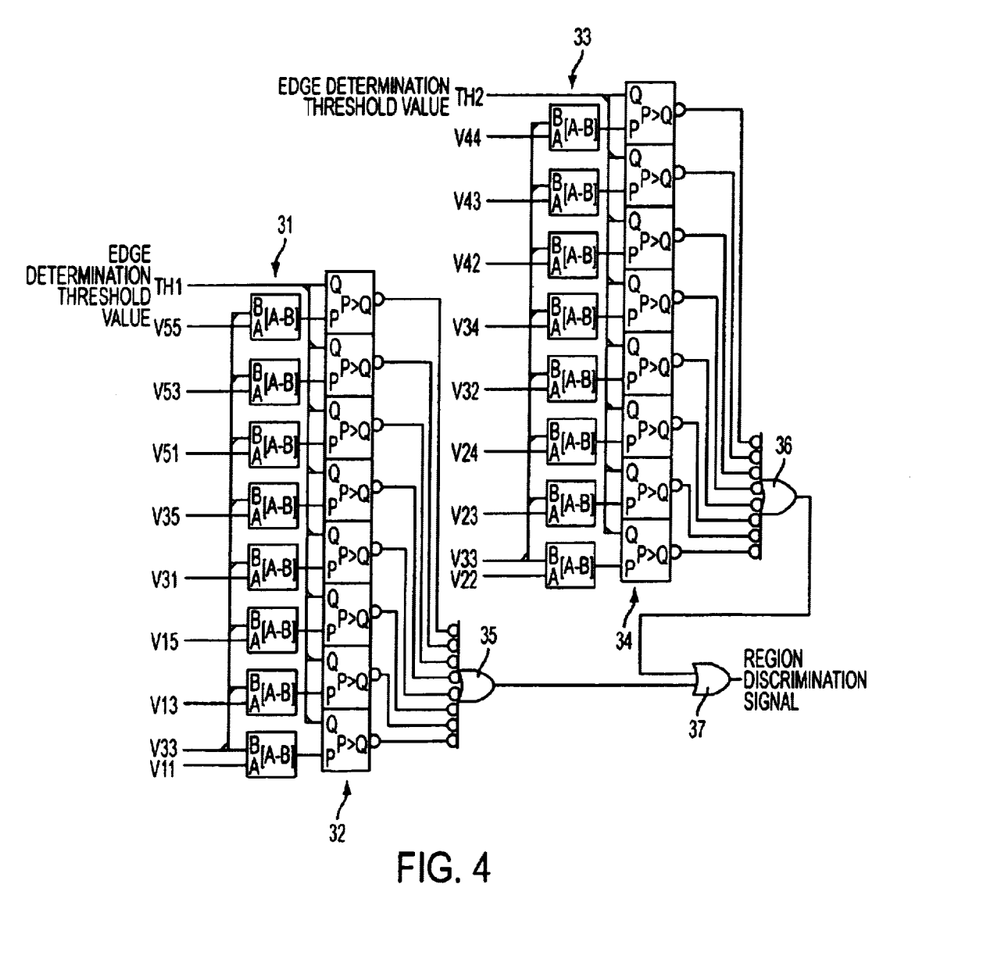
FIG. 4 shows an exemplary structure of a region discrimination unit.

Returning to FIG. 1, the region discrimination unit 3 determines whether each of the pixels of the original image is a pixel in the character edge region or a pixel in the continuous tone region. The discrimination size in the region discrimination unit 3 is 5×5 pixels, which is the same as the size of a filter for smoothing described later. In this case, the discrimination size is the size of a reference pixel region used for the region discrimination. That is, the discrimination size is the size of a pixel matrix comprising a target pixel and its peripheral pixels. The region discrimination unit 3 comprises, as shown in FIG. 4, eight difference elements 31, eight comparators 32, eight difference elements 33, eight comparators 34, and three OR circuits 35, 36 and 37.

The difference elements 31 are supplied with the image data of a target pixel (V33) and eight peripheral pixels (V11, V13, V15, V31, V35, V51, V53 and V55) at a distance of two dots from the target pixel. The comparators 32 are supplied with an edge determination threshold value TH1 and the outputs from the difference elements 31. The outputs from the comparators 32 are supplied to the OR circuit 35.

Likewise, the difference elements 33 are supplied with the image data of the target pixel (V33) and eight pixels (V22, V23, V24, V32, V34, V42, V43 and V44) surrounding the target pixel. The comparators 34 are supplied with an edge determination threshold value TH2 and the outputs from the difference elements 33. The outputs from the comparators 34 are supplied to the OR circuit 36. The output from the OR circuit 35 and the output from the OR circuit 36 are supplied to the OR circuit 37. The output from the OR circuit 37 is a region discrimination signal.

The region discrimination unit 3 determines whether the target pixel (V33) is a pixel in the character edge region when at least one of the tone differences between the target pixel (V33) and the eight peripheral pixels (V11, V13, V15, V31, V35, V51, V53 and V55) at a distance of two dots from the target pixel (V33) or the eight pixels (V22, V23, V24, V32, V34, V42, V43 and V44) surrounding the target pixel (V33) exceeds the edge determination threshold value TH1 or TH2. Conversely, when none of the tone differences between the target pixel (V33) and the eight peripheral pixels (V11, V13, V15, V31, V35, V51, V53 and V55) at a distance of two dots from the target pixel (V33) or the eight pixels (V22, V23, V24, V32, V34, V42, V43 and V44) surrounding the target pixel (V33) exceeds the edge determination threshold value TH1 or TH2, the region discrimination unit 3 determines that the target pixel (V33) is a pixel in the continuous tone region.

Referring again to FIG. 1, the first tone reproduction unit 9 outputs the image data of the original image as is. The image data of the target pixel of the pixel matrix supplied from the FIFO memory 2 is output as is. The second tone reproduction unit 4 performs a predetermined tone reproduction processing on the image data of the original image. The second tone reproduction unit 4 is provided with a smoothing unit 6 that performs smoothing and a screening unit 7 that performs screening. In addition to these units, a unit performing a processing emphasizing gradation may be provided in the second tone reproduction unit 4. Smoothing and screening are performed at the second tone reproduction unit 4, as described above, in order to increase the number of tones so that a smooth density change is expressed and to prevent moiré generation in the output (reproduced) images.

Figure 5:
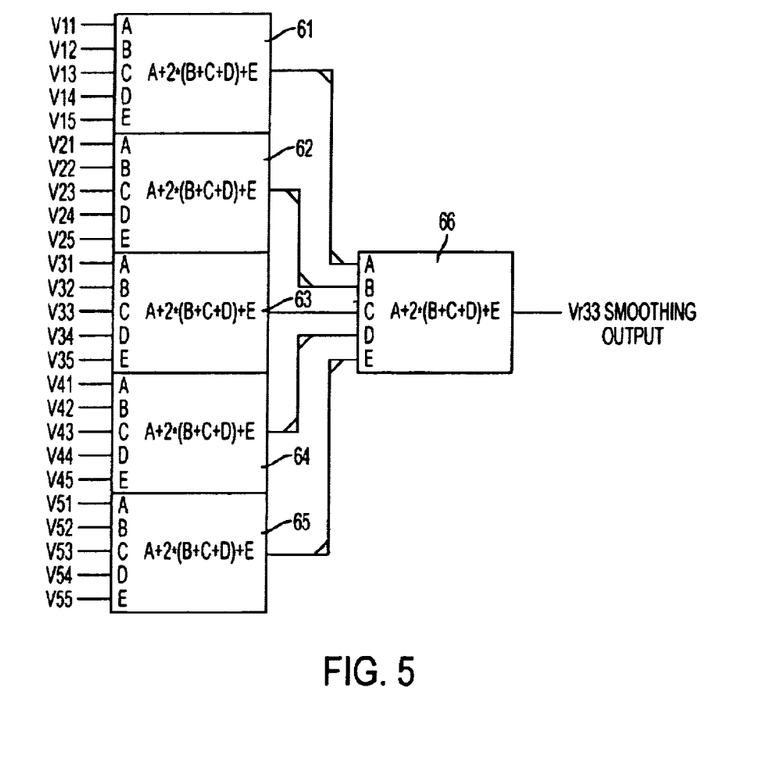
FIG. 5 shows an exemplary structure of a smoothing unit.
Figure 6:
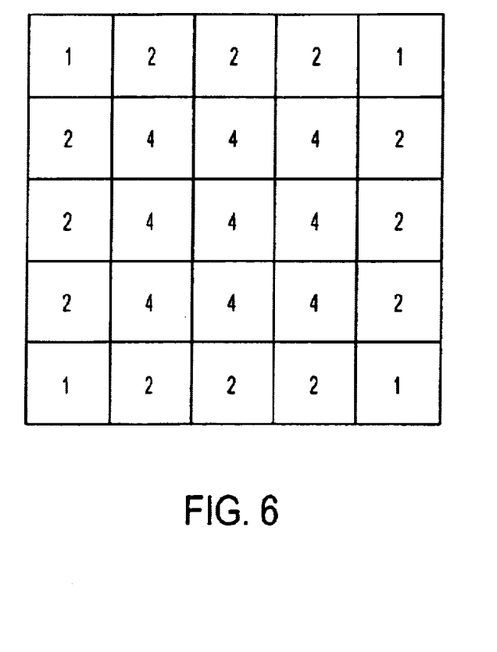
FIG. 6 shows weighting factors used for smoothing.

The smoothing unit 6 performs smoothing with a filter size of 5×5 pixels. As shown in FIG. 5, the smoothing unit 6 comprises six computing elements 61 to 66. The computing elements 61 to 66 are each provided with five input terminals (terminals A, B, C, D and E), and output one computation result (A+2×(B+C+D)+E) for the signals fed to the input terminals. The outputs of the computing elements 61 to 65 are supplied to the computing element 66, and the computation result is output as a smoothing output. As a result of these computations, the smoothing output from the computing element 66 is a smoothing output for the target pixel in the pixel matrix, which output is obtained by multiplying the image data of each of the pixels in the pixel matrix by a weighting factor shown in FIG. 6 and adding the multiplication results. For example, the weighting factor for the pixel V22 is 4, and that for the pixel V55 is 1.

When the target pixel of the smoothing is V33, the image data of the pixels V11, V12, V13, V14 and V15 are fed to the input terminals A, B, C, D and E of the computing element 61, respectively. The image data of the pixels V21, V22, V23, V24 and V25 are fed to the input terminals A, B, C, D and E of the computing element 62, respectively. The image data of the pixels V31, V32, V33, V34 and V35 are fed to the input terminals A, B, C, D and E of the computing element 63, respectively. The image data of the pixels V41, V42, V43, V44 and V45 are fed to the input terminals A, B, C, D and E of the computing element 64, respectively. The image data of the pixels V51, V52, V53, V54 and V55 are fed to the input terminals A, B, C, D and E of the computing element 65, respectively.

Then, the output of the computing elements 61 to 65 are fed to the computing element 66. Specifically, the output of the computing element 61 is fed to the input terminal A of the computing element 66, the output of the computing element 62 is fed to the input terminal B of the computing element 66, the output of the computing element 63 is fed to the input terminal C of the computing element 66, the output of the computing element 64 is fed to the input terminal D of the computing element 66, and the output of the computing element 65 is fed to the input terminal E of the computing element 66. Then, the result of the computation at the computing element 66 is output as a smoothing output Vr33 of the target pixel. This processing is performed for each pixel of the original image to thereby perform smoothing on the original image.

Figure 7:
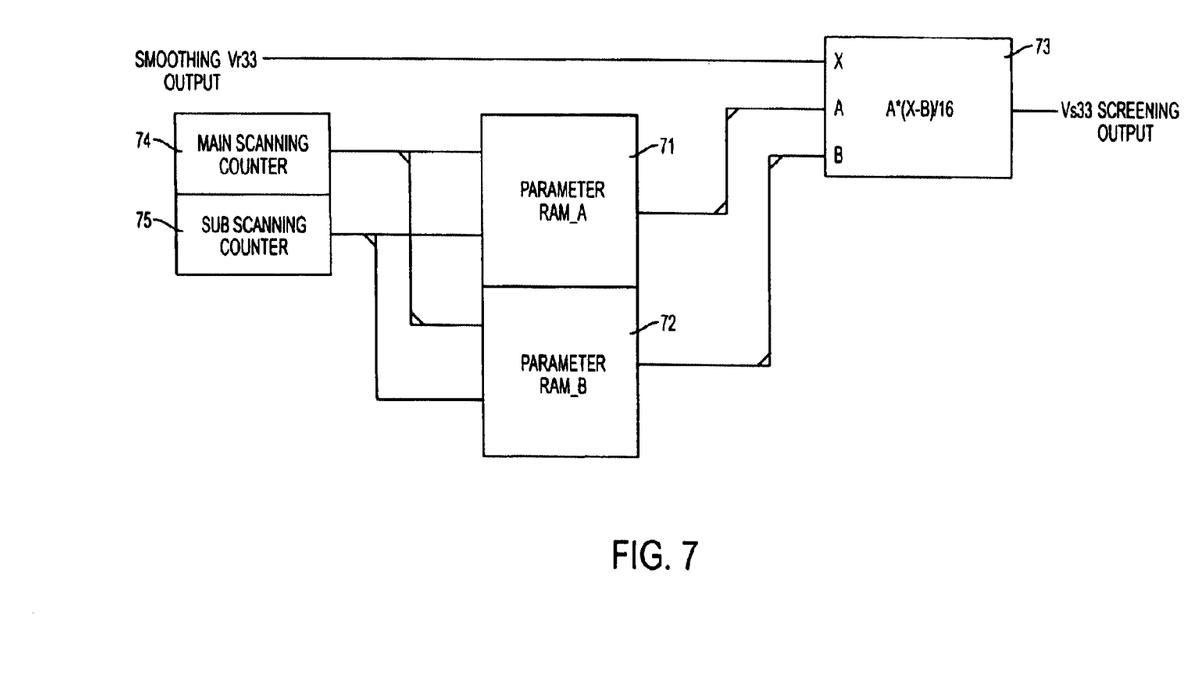
FIG. 7 shows an exemplary structure of a screening unit.
Figure 8:
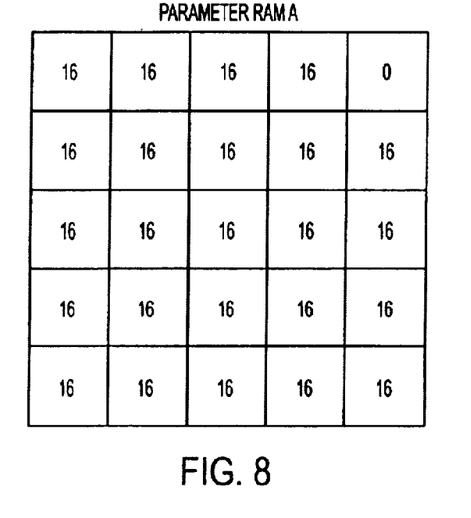
FIG. 8 shows the contents of a parameter random-access memory (RAM).
Figure 9:
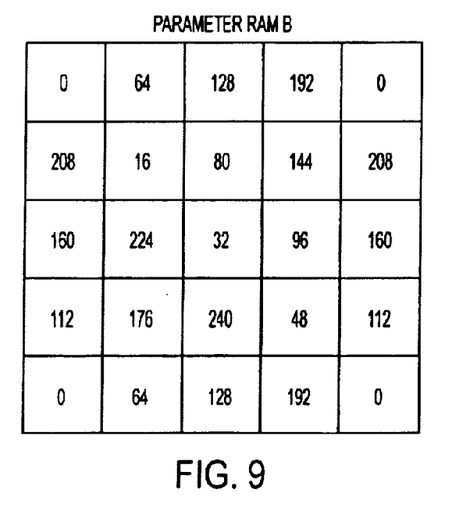
FIG. 9 shows the contents of another parameter RAM.
Figure 10:
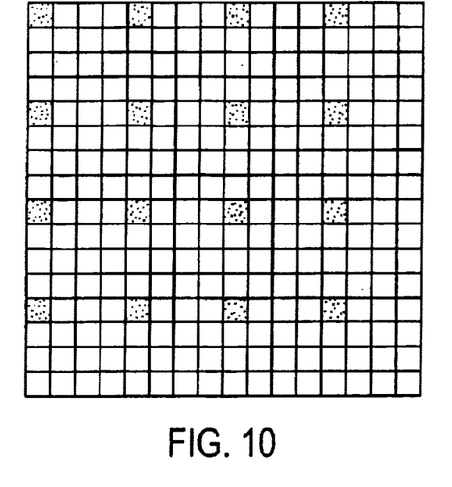
FIG. 10 shows a result of screening (tone level 16).
Figure 11:
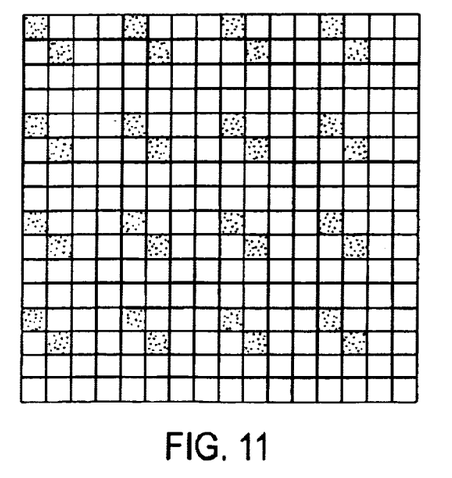
FIG. 11 shows a result of screening (tone level 32).
Figure 12:
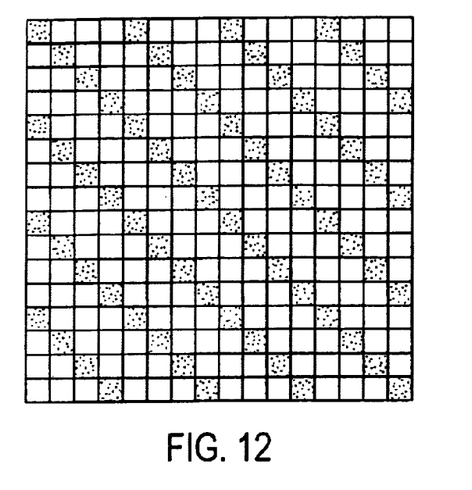
FIG. 12 shows a result of screening (tone level 64).
Figure 13:
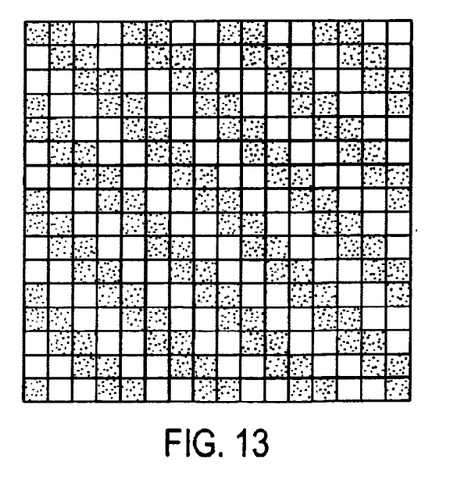
FIG. 13 shows a result of screening (tone level 128).
Figure 14:
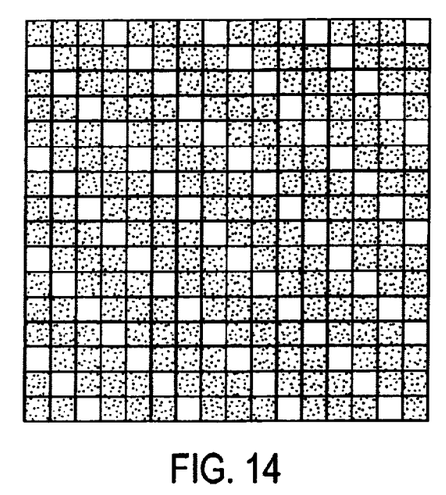
FIG. 14 shows a result of screening (tone level 192).

The screening unit 7 comprises, as shown in FIG. 7, parameter RAMs 71 and 72, a computing element 73, a main scanning counter 74 and a sub scanning counter 75. In the parameter RAM 71, the data shown in FIG. 8 is written, and in the parameter RAM 72, the data shown in FIG. 9 is written. Based on the output from the main scanning counter 74 and the sub scanning counter 75, one parameter is selected from each of the parameter RAMs 71 and 72. This parameter selection changes at predetermined intervals according to the output from the main scanning counter 74 and the sub scanning counter 75.

The computing element 73 has three input terminals (terminals X, A and B), and outputs the computation result $(A \times (X-B)/16)$ for the input signals as the screening output. The input terminal X is fed with the smoothing output from the smoothing unit 6. For example, when the target pixel of the screening is V33, the input terminal X of the computing element 73 is fed with the smoothing output Vr33. The input terminal A is fed with the value of the parameter selected from the parameter RAM 71, and the input terminal B is fed with the value of the parameter selected from the parameter RAM 72. That is, the input terminals A and B are fed with the values of the parameters that change at predetermined intervals according to the output of the main scanning counter 74 and the sub scanning counter 75.

Exemplary results of the screening at the screening unit 7 are shown in FIGS. 10 to 14. As shown in these figures, when screening is performed, the screening output is an image having an oblique line pattern. The tone levels in FIGS. 10 to 14 are different from one another (the tone level takes values from 0 to 255): 16 in FIG. 10, 32 in FIG. 11, 64 in FIG. 12, 128 in FIG. 13, and 192 in FIG. 14.

Referring to FIG. 1, the image output unit 5 outputs processed image data. Based on the image data output therefrom, an image outputter 8, such as a printer, produces an output (reproduced) image. The image output unit 5 switches the output for the target pixel based on the result of the determination by the region discrimination unit 3. For the pixels determined to be pixels in the character edge region by the region discrimination unit 3, the image output unit 5 outputs the image data output from the first tone reproduction unit 9. For pixels determined to be pixels in the continuous tone region by the region discrimination unit 3, the image output unit 5 outputs the image data output from the second tone reproduction unit 4.

Next, an image processing operation in the image processor having the above-described structure will be described. In this example, the original image shown in FIG. 15 is processed as described below. This original image has a size of 14×14 pixels, and a line with a width of five pixels is drawn in the sixth pixels from the left of the figure.

First, the image input unit 1 reads the original image shown in FIG. 15 to obtain image data. For the image data obtained by the image input unit 1, the pixel matrix as shown in FIG. 2 is referred to by the FIFO memory 2. Then, the image data of the pixel matrix is supplied to the region discrimination unit 3, the first tone reproduction unit 9 and the second tone reproduction unit 4.

Figure 16:
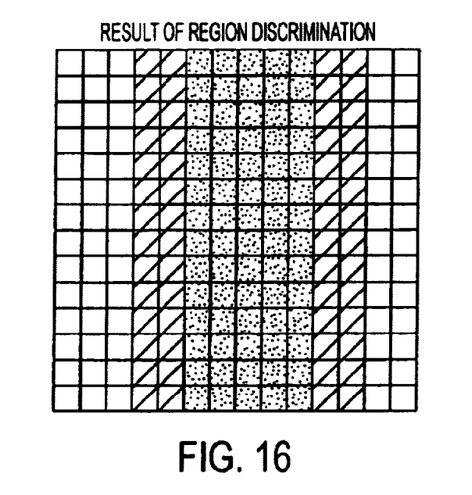
FIG. 16 shows a result of region discrimination by a region discrimination unit.

On the image data supplied to the region discrimination unit 3, region discrimination is performed for each pixel. That is, the region discrimination unit 3 determines whether pixels in the original image belong to the character edge region or the continuous tone region. The pixels of the original images are divided into pixels in the character region and pixels in the continuous tone region by the region discrimination unit 3. A result of the determination by the region discrimination unit 3 is shown in FIG. 16. In the figure, the fourth to the seventh pixels (dots) (four-pixel width) and the ninth to the twelfth pixels (four-pixel width) from the left are determined to be the character edge region. The region other than the character edge region is determined to be the continuous tone region. That is, in the figure, the first to the third pixels (three-pixel width), the eighth pixel (one-pixel width), and the thirteenth and the fourteenth pixels (two-pixel width) from the left are determined to be the continuous tone region.

Figure 17:
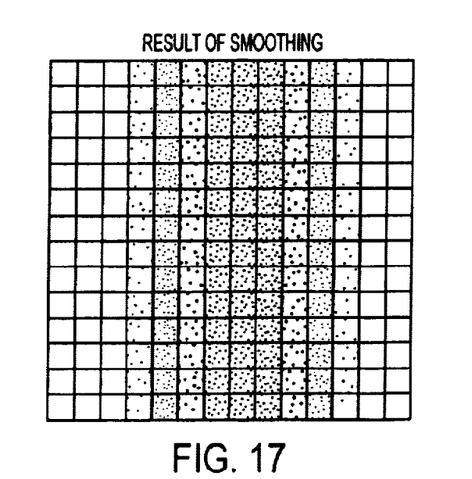
FIG. 17 shows a result of smoothing by a smoothing unit.
Figure 18:
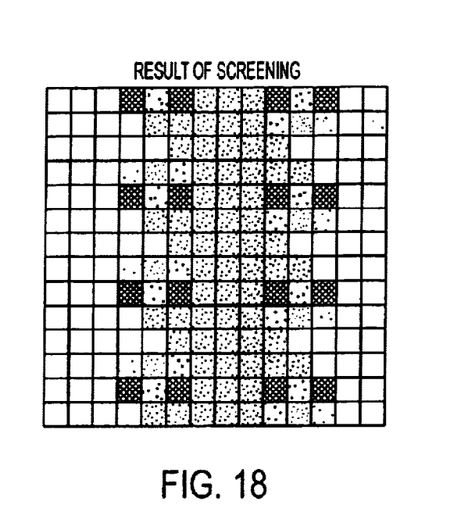
FIG. 18 shows a result of screening by a screening unit.

The image data supplied to the first tone reproduction unit is output as is, and is supplied to the image output unit 5. On the image data supplied to the second tone reproduction unit 4, smoothing is performed by the smoothing unit 6. A result of the smoothing by the smoothing unit 6 is shown in FIG. 17. Then, on the image having undergone smoothing, screening is performed by the screening unit 7. A result of the screening by the screening unit 7 is shown in FIG. 18. As illustrated in the figure, when screening is performed on an image having undergone smoothing, the part corresponding to the character edge region becomes jagged. Then, the image data processed by the second tone reproduction unit 4 is supplied to the image output unit 5.

Consequently, two kinds of image data are supplied to the image output unit 5. That is, the image output unit 5 is supplied with the image data of the original image as is, and the image data obtained by performing smoothing and screening on the image data of the original image.

Figure 19:
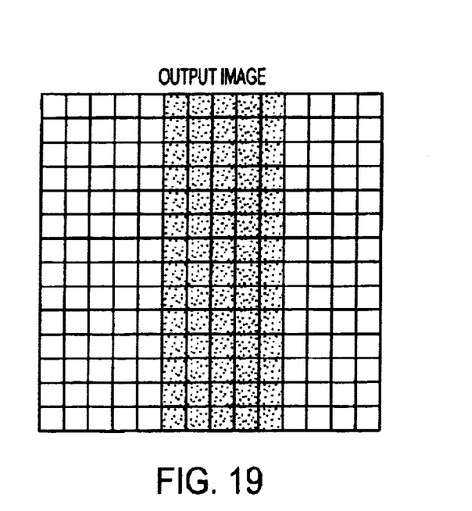
FIG. 19 shows an output image having undergone image processing.

The image data of the output image is output by the image output unit 5. Specifically, for the pixels determined to be pixels in the character edge region by the region discrimination unit 3, the image data obtained by the image input unit 1 is output. For the pixels determined to be pixels in the continuous tone region by the region discrimination unit 3, the image data processed by the second tone reproduction unit 4 is output. Then, based on the output from the image output unit 5, an output image as shown in FIG. 19 is produced by the image outputter 8. As illustrated in FIG. 19, a high quality output image is obtained which is a faithful reproduction of the original image (see FIG. 15) without noise around the character edge region due to smoothing.

As described above in detail, according to the image processor of this embodiment, the region discrimination size (5×5 pixels) in the region discrimination unit 3 is the same as the filter size (5×5 pixels) in the smoothing unit 6. That is, the region discrimination size in the region discrimination unit 3 is not smaller than the size of the filter for smoothing. Consequently, when smoothing is performed on the pixels determined to be pixels in the continuous tone region by the region discrimination unit 3, white pixels or close-to-white pixels are present in the filter for smoothing. That is, the character part (black pixels) is not included in the filter for smoothing. Hence, noise does not result around the character edge region due as a result of smoothing.

In this example, the region discrimination size in the region discrimination unit 3 and the filter size in the smoothing unit 6 are the same. Hence, it is only necessary to set the sizes so that a relationship $n \geq m$ is satisfied when the region discrimination size is n×n pixels and the size of the filter for smoothing is m×m. A similar effect is obtained when this condition is satisfied.

Additionally, the output image is produced based on the image data output from the first tone reproduction unit 9 and on the image data output from the second tone reproduction unit 4. The image data output from the first tone reproduction unit 9 is for the pixels determined to be pixels in the character edge region by the region discrimination unit 3, and the image data output from the second tone reproduction unit 4 is for the pixels determined to be pixels in the continuous tone region by the tone discrimination unit 3. Consequently, moiré generation is prevented in the continuous tone region and a smooth density change is reproduced while character sharpness is ensured. That is, a high quality output image which is a faithful reproduction of the original image is obtained.

This embodiment is merely an example and does not limit the present invention. It is therefore to be understood that various improvements and modifications may be made in the present invention without departing from the spirit and scope thereof. While image data is output as it is from the first tone reproduction unit 9 in the above-described embodiment, image data having undergone a tone reproduction processing emphasizing resolution such as character enhancement (edge enhancement) may be output, because this increases character sharpness and consequently, a high quality reproduced image in which characters are sharper is obtained.

As described above, according to this embodiment, an image processor is provided in which degradation in reproduced image quality is prevented by keeping noises from being caused around the character edge region due to smoothing.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processor, comprising:
    a region discrimination unit which determines whether each pixel of image data is a pixel in a character edge region or a pixel in a continuous tone region;
    a first tone reproduction unit which performs tone reproduction processing with an emphasis on resolution of the image data;
    a second tone reproduction unit which performs tone reproduction processing with an emphasis on gradation on the image data; and
    an image output unit which produces an output after performing the processing by the first tone reproduction unit or the processing by the second tone reproduction unit based on a result of the determination by the region discrimination unit, wherein
    the processing by the second tone reproduction unit includes at least smoothing on the image data and screening on the image data having undergone smoothing,
    the smoothing is performed to reduce moiré generated by screening, and
    when a region discrimination size in the region discrimination unit is n×n pixels and a size of a filter for the smoothing performed by the second tone reproduction unit is m×m pixels, a relationship $n \geq m$ holds.

2. An image processor as claimed in claim 1, wherein said image output unit outputs image data processed by the first tone reproduction unit for a pixel determined to be a pixel in the character edge region by the region discrimination unit, and outputs image data processed, by the second tone reproduction unit for a pixel determined to be a pixel in the continuous tone region by the region discrimination unit.

* * * * *